April 16, 1957   C. E. WEST   2,788,583
APPARATUS FOR MEASURING THE SIZE OF CIRCULAR OBJECTS
Filed Oct. 23, 1953   2 Sheets-Sheet 1
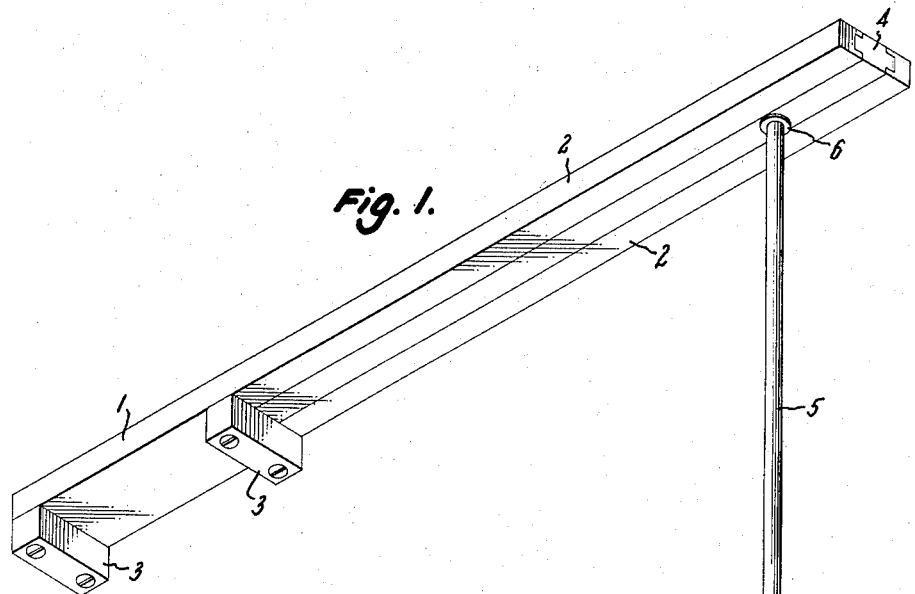
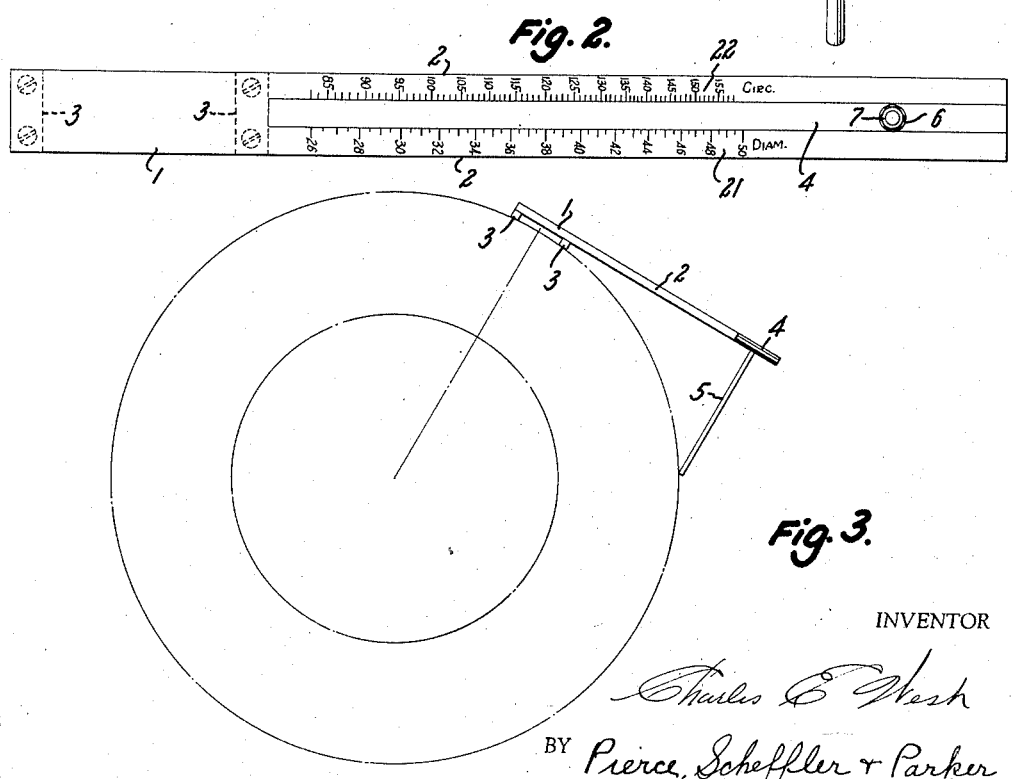
INVENTOR
Charles E. West
BY Pierce, Scheffler & Parker
ATTORNEYS

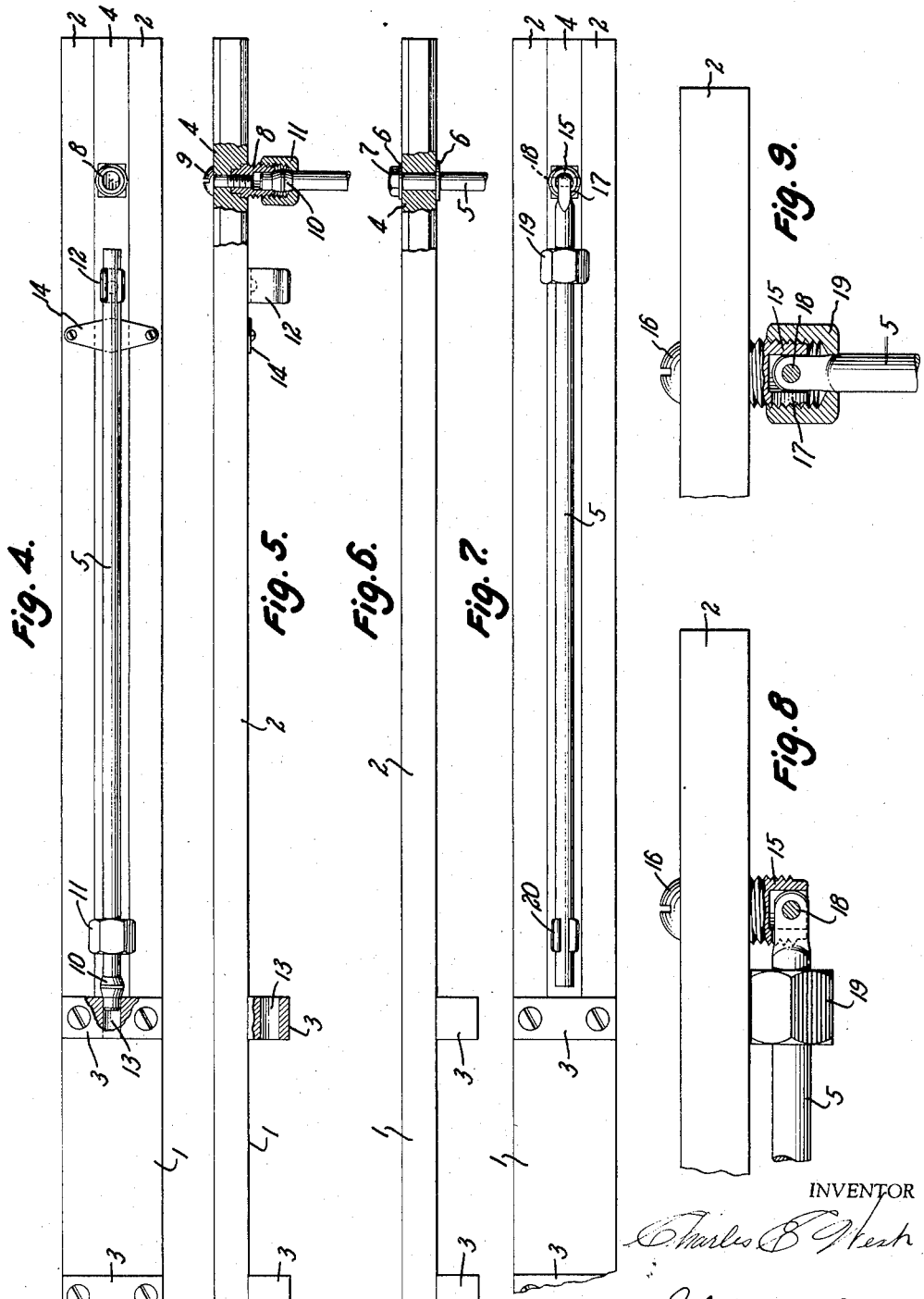

United States Patent Office 2,788,583
Patented Apr. 16, 1957

2,788,583

APPARATUS FOR MEASURING THE SIZE OF CIRCULAR OBJECTS

Charles E. West, Masontown, Pa.

Application October 23, 1953, Serial No. 387,828

4 Claims. (Cl. 33—178)

This invention relates to apparatus for measuring the diameter and/or circumference of circular objects such as automobile, bus and truck tires, pipe, tanks, trees, logs, wheels, pulleys, etc.

A purpose of my invention is to provide an apparatus or tool adapted to be readily and quickly applied for measuring the diameter and/or circumference of an object having a circular cross section perpendicular to its axis and particularly an object of large size and/or which may be so situated that the conventional tools for making these measurements, such as calipers and measuring tapes, are not readily applicable.

A further object of my invention is to provide a measuring tool which may be of a size adapted to be carried in the hand or even in a pocket but which is applicable for measuring objects of relatively large size.

A further object of my invention is to provide a measuring tool which is relatively inexpensive but nevertheless durable and reasonably accurate.

It is well known that truck tires "grow" in service and that tires of the same manufacture and originally intended to be of the same size may attain a difference in over-all diameter as great as 1½ inch. It is also known that tires of different manufacturers bearing the same size markings will differ considerably in over-all diameter when mounted.

The tool of my invention will be described hereinafter for the purpose of illustration with reference to the measurement of the size (diameter and/or circumference) of bus and truck tires. As is well known it is quite important in the use of bus and truck tires mounted in dual to have the tires of substantially the same size. It is highly desirable in matching such tires to be able to measure them quickly and accurately i. e. to an accuracy of about ⅛ inch.

Several illustrative embodiments of the tool of my invention are shown in the accompanying drawings in which Fig. 1 is a perspective view of the tool, Fig. 2 is a top plan view, Fig. 3 illustrates how the tool is applied to measure the size of a circular object, Fig. 4 is a top plan view of a tool provided with a detachable feeler, Fig. 5 is a side elevation with parts appearing in section of the tool shown in Fig. 4, Fig. 6 is a side elevation with parts appearing in section of the tool shown in Figs. 1 and 2, Fig. 7 is a plan view of another modification having a hinged feeler, Fig. 8 is a side elevation of the right hand end of the tool as it appears in Fig. 7 with the feeler folded to inoperative position, and Fig. 9 is a side elevation with parts appearing in section of the right hand end of the tool as it appears in Fig. 7 with the feeler in operative position.

Referring to the drawings the tool comprises a frame consisting of the solid portion 1 and the two parallel, spaced apart, grooved slide supports 2, 2, the contact blocks 3, 3 secured to the solid portion 1, the slide 4 and the gauge rod or feeler 5. These parts may be made of any suitable materials, for instance the frame, blocks and slide may be wood and the gauge rod may be metal. The parts should be sufficiently rigid that such bending or flexing thereof as may occur in use will not materially affect the measurements. As illustrated a tool designed for the measurements of tires having diameters from about 26 to about 50 inches conveniently may be about 16 inches long, about 1¼ to 1½ inches wide and about ⅜ to ½ inch thick. It is to be understood that these figures are given merely for the purpose of illustration and are not limitative.

A tool similar to that illustrated might be made of such a size that it would measure the radius of a circle directly. That is, the distance from a point midway between the contact blocks 3, 3 to the feeler 5 might be made equal to the radius of the circle to be measured. In that case the length of the feeler 5 would have to be at least slightly greater than the radius of the circle to be measured so that it would contact the circle at a point 90° from the point on the circle adjacent to the point midway between the blocks 3, 3. It will be appreciated however that such a half-caliper tol designed to measure the radius of tires up to 50 inches in diameter or even larger would have to be of a relatively large size. My invention is concerned only with tools in which the length of the feeler 5 is less than the distance between a point midway between the blocks 3, 3 and the feeler 5 when the slide is in its retracted position i. e. tools which are not capable of directly measuring the radius of the circle in question. In other words my invention is concerned only with a tool which is capable of measuring the diameter and/or circumference of a circle by application to only a small portion of the circle i. e. an arc of less than 90° thereof.

Referring again to the drawings it will be seen that the contact blocks 3, 3 have plane surfaces in a plane parallel to the portion 1 and are of such height relative to the distance between them that the portion 1 of the tool never comes into contact with the circle to be measured. In a tool for measuring tires having diameters within the range from 26 to 50 inches I have found blocks about ½ inch high spaced apart about 3 inches to be satisfactory. The blocks may be of any desired shape e. g. they may be blunt points or blunt edges, but they should not be so sharp that when firmly pressed against the surface of the circular object to be measured e. g. a tire tread, they will appreciably deform the surface and possibly as a result give an incorrect measurement. For measuring tires I have found simple rectangular blocks to be entirely satisfactory.

The slide 4 and slide supports 2, 2 are illustrated and described as having cooperating tongues and grooves but it is apparent that this structure may be substituted by several other equivalent structures such as concentric tubes or a rod slidable within a tube. It will be evident that the solid portion 1 is not essential and that the slide supports 2, 2 may extend the full length of the tool and be supported in parallel relationship by the bearing blocks 3, 3. In that case the slide 4 also would extend the entire length of the tool between the slide supports 2, 2. I wish to note further that the parts 1, 2, 2, 3, 3 and 4 might be replaced by two concentric tubes or a tube and a rod slidable therein, one end of the outer tube carrying the bearing blocks 3, 3.

From the foregoing description of possible variations in structure it will be apparent that the tool consists essentially of two longitudinally adjustable parts with spaced apart bearing blocks rigidly secured to one of said parts adjacent one end thereof and a feeler extending substantially perpendicularly from the remote end of the other of said two longitudinally adjustable parts in the same lateral direction as said bearing blocks.

In the form of the invention illustrated in Figs. 1, 2 and 6 the feeler 5 is rigidly but detachably secured in an opening in the slide 4 by means of the washers 6, 6 and the nut 7.

In the modification illustrated in Figs. 4 and 5 the feeler 5 is more readily detachable from the slide 4. In this modification the slide 4 is provided with the externally threaded socket 8 secured to the slide by means of the screw 9. The feeler 5 is provided with the shoulder 10 at a short distance from one end thereof, said end being adapted to fit into the socket 8. The feeler is further provided with the internally threaded sleeve 11 which is adapted to screw on to the socket 8 and bear against the shoulder 10 and thus firmly to secure the end of the feeler 5 in the socket 8 as shown in Fig. 5. The slide 4 is provided with the spring clip 12 and the adjacent bearing block 3 is provided with the opening or socket 13 to support the feeler 5 in inoperative and out-of-the-way position. In this modification I have shown the cross strap 14 which serves to hold the slide supports 2, 2 in parallel relationship. This strap is optional and is omitted in the modification illustrated in Figs. 1, 2 and 6.

In the further modification illustrated in Figs. 7, 8 and 9 the feeler 5 is hinged to the slide 4. As illustrated the slide 4 is provided with the externally threaded socket 15 secured to the slide 4 by means of the screw 16. The socket 15 is provided with the lateral slot 17 and with the cross pin 18 which extends through the opposite walls of the socket 15 and through an opening in the end of the feeler rod 5. The sleeve nut 19 serves to secure the rod 5 in its operative position as shown in Fig. 9 and the clip 20 on the slide 4 serves to secure it in its inoperative position.

The use of the device is illustrated in Fig. 3. As shown the bearing blocks 3, 3 are seated on the circumference of the circle to be measured and the slide 4 is adjusted until the end of the feeler 5 is in contact with the circumference and the diameter and/or circumference of the circle are read from the scales 21 and/or 22. This scale may be determined mathematically or by measuring circles of different diameters and marking the points on the scale. In the device illustrated I have used the inner end of the slide 4 as the starting point but it is evident that any other arbitrary point on the slide 4 might be used as the index point.

I have found the instrument to be sufficiently accurate for the purpose of matching dual truck and bus tires in spite of the flexibility of the tires and the irregularities commonly found in their surfaces. I attribute the utility of the instrument to a combination of its features including (1) its small size and light weight which permits it to be easily applied to a tire in the various positions thereof which may be encountered, (2) the fact that the contact blocks 3, 3 do not materially deform the surface or deform it equally so that the slide supports 2, 2 are always positioned perpendicular to the radius which extends through a point midway between the blocks, (3) to the fact that the instrument may be applied to a portion of the tire which is free of defects and not deformed and (4) to the fact that the blocks 3, 3 which establish the points of contact with the tire are at a fixed distance from each other and may be applied without pressure which might tend to deform the tire surface.

I claim:

1. A measuring device for circular objects comprising a slide support having two spaced apart parallel contact blocks extending laterally therefrom adjacent one end thereof, said blocks having plane surfaces in a plane parallel to said support, a slide member movable longitudinally relative to said slide support, a feeler extending substantially perpendicularly to said slide member adjacent the end thereof remote from said contact blocks, and a scale indicating the size of a circular object when said contact blocks and the end of said feeler are in contact therewith, the length of said feeler being less than the distance between a point midway between said blocks and said feeler.

2. A measuring device as defined in claim 1 in which the contact blocks are right parallelepipedons.

3. A measuring device as defined in claim 1 in which the feeler is detachably secured to the slide member.

4. A measuring device as defined in claim 1 in which the feeler is hinged to the slide member.

References Cited in the file of this patent

UNITED STATES PATENTS

| | | |
|---|---|---|
| 1,245,213 | Gammeter | Nov. 6, 1917 |
| 2,408,746 | Evert | Oct. 8, 1946 |

FOREIGN PATENTS

| | | |
|---|---|---|
| 154,266 | Germany | Sept. 14, 1904 |